M. J. Knox,
Clothes Frame,
N° 35,027. Patented Apr. 22, 1862.
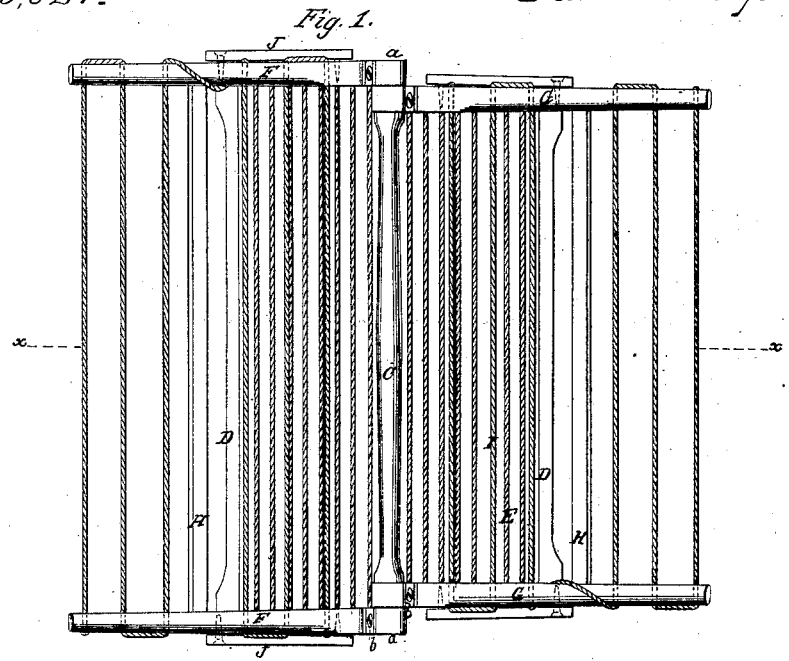
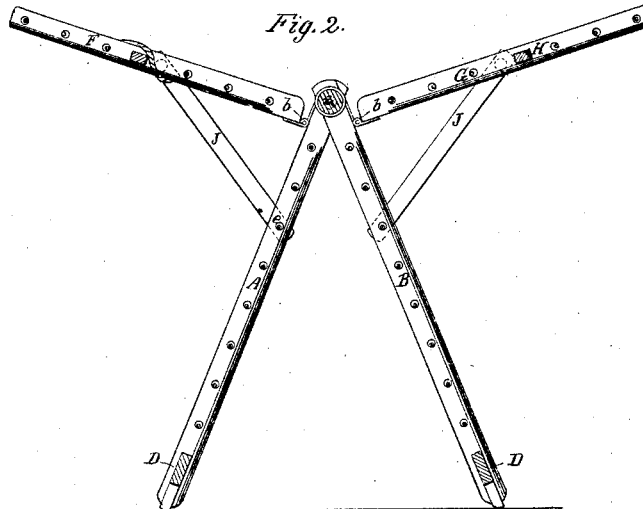 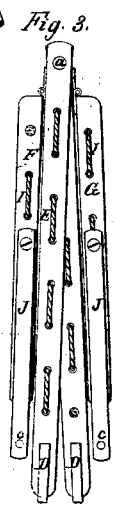
Witnesses
Inventor

UNITED STATES PATENT OFFICE.

M. J. KNOX, OF KNOX CORNERS, NEW YORK.

IMPROVED CLOTHES-FRAME.

Specification forming part of Letters Patent No. 35,027, dated April 22, 1862.

*To all whom it may concern:*

Be it known that I, M. J. KNOX, of Knox Corners, in the county of Oneida and State of New York, have invented a new and Improved Clothes-Frame; and I do hereby declare the following to be a full, clear, and exact description of the same, reference being had to the accompanying drawings, making a part of this specification, in which—

Figure 1 is a plan of my improved clothes-frame in a condition for hanging clothes on. Fig. 2 is a transverse section of the same taken at the line $x\ x$ of Fig. 2. Fig. 3 is an end view of the frame in a closed form.

Similar letters of reference indicate corresponding parts in the several figures.

The object of this invention is to obtain a clothes-frame which can be used either in the house or out of doors for drying clothes, and which, when not in use, can be folded up into a convenient and compact form, so as to occupy but little room.

The invention consists in attaching supplemental frames on opposite sides and near the top to the main frame, whereby its drying capacity is nearly doubled, and the frame made so as to occupy, when standing or folded up, but little more room than the main frame would alone.

To enable others skilled in the art to fully understand and construct my invention, I will proceed to describe it.

A A and B B represent, respectively, the upright pieces of the two halves of the main frame, which are connected together at top by a bar, C, and pivots $a\ a$ in the ends thereof, and each at bottom by a rail, D, which extends longitudinally of the frame and parallel with the bar C.

Each of the upright pieces of the main frame have horizontal perforations made in them at suitable distances apart, through which a clothes-line, E, is alternately passed back and forth in each half of the frame, forming a rack of parallel lines extending horizontally one above the other from near the top to near the bottom of the frame.

F F and G G represent, respectively, the end pieces of the supplemental frames, which are attached at their lower ends on the outside and near the top to the upright pieces of the main frame by hinges $b\ b$, and the end pieces of each frame connected together by a bar, H, extending longitudinally thereof and mortised at each end into the end pieces about midway of their length. The end pieces of the supplemental frames are also perforated, and have a clothes-line, I, passed through and stretched between them in the same manner as the lines between the upright pieces of each half of the main frame.

The supplemental frames on the outside of each of the end pieces are provided with hinged arms J J, which have each a pin, $e$, projecting from their inner side, by means of which and the perforations in the upright pieces of the main frame the supplemental frames can be adjusted and secured in any desired position.

The frame being folded up, as shown in Fig. 3, to adapt it for holding a quantity of clothes to be dried, the lower extremities of the two halves of the main frame are spread out, forming two inclined planes connected together at their upper ends. The supplemental frames are then temporarily turned up out of the way, and the projecting pins of the hinged arms inserted into the perforations of the upright pieces to retain them in an elevated position until the lines of the main frame are filled with clothes.

If it is desired to dry more clothes than can be suspended from the lines of the main frame, the supplemental frames are turned down to a convenient position for hanging the clothes on the lines, after which they are turned up and secured in an elevated position in the manner hereinbefore described.

The supplemental frames and arms J are intended to be connected to the main frame by means of slip hinges, hooks, or other conveniently-detachable fastenings, so that either or both of the supplemental frames, with their arms J, may be separated from the main frame at pleasure. Thus three separate effective clothes-frames may be obtained, if desired. The arms J J are intended to be laced with ropes, to receive clothes, like the frames.

Having thus described my invention, I claim as new and desire to secure by Letters Patent—

As an improved article of manufacture, a clothes-frame composed of the three conjoined but independent and separable frames, A B F G, with arms J, constructed, combined, and operating as herein shown and described.

M. J. KNOX.

Witnesses:
WILLIAM M. FAIRCHILD,
WILLIAM C. LEACH.